United States Patent
Ogawa

(10) Patent No.: US 8,890,447 B2
(45) Date of Patent: Nov. 18, 2014

(54) STARTUP CONTROL CIRCUIT OF DRIVE CIRCUIT

(75) Inventor: Takashi Ogawa, Ogaki (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 338 days.

(21) Appl. No.: 13/241,359

(22) Filed: Sep. 23, 2011

(65) Prior Publication Data

US 2012/0074882 A1 Mar. 29, 2012

(30) Foreign Application Priority Data

Sep. 27, 2010 (JP) ................................. 2010-215908

(51) Int. Cl.
*H02P 6/20* (2006.01)

(52) U.S. Cl.
CPC ....................................... *H02P 6/20* (2013.01)
USPC ...... 318/119; 318/126; 318/400.11; 318/282; 318/686

(58) Field of Classification Search
CPC ........................................................ H02P 6/20
USPC ......... 318/119, 122, 135, 686, 687, 126, 128, 318/400.11, 280–282, 443, 504
See application file for complete search history.

(56) References Cited

U.S. PATENT DOCUMENTS

| 6,943,510 B2* | 9/2005 | Gorti ............................. 318/275 |
| 7,839,104 B2* | 11/2010 | Imai et al. ..................... 318/268 |
| 2010/0026219 A1* | 2/2010 | Nakai ....................... 318/400.11 |

FOREIGN PATENT DOCUMENTS

| JP | 8-037798 A | 2/1996 |
| JP | 10-191679 A | 7/1998 |
| JP | 2001-352777 A | 12/2001 |
| JP | 2006-288056 A | 10/2006 |

OTHER PUBLICATIONS esp@cenet Patent Abstract for Japanese Publication No. 2001-352777, publication date Dec. 21, 2001. (1 page).
esp@cenet Patent Abstract for Japanese Publication No. 2006-288056, publication date Oct. 19, 2006. (1 page).
esp@cenet Patent Abstract for Japanese Patent No. 8-037798, date Feb. 6, 1996. (1 page).
Office Action issued in corresponding Korean Application No. 10-2011-96255 dated Sep. 25, 2012 and English translation thereof (7 pages).
English abstract of Japanese Publication No. 10-191679 published on Jul. 21, 1998, Espacenet database, 1 page.

* cited by examiner

*Primary Examiner* — Bentsu Ro

(57) ABSTRACT

Startup of motor is reliably executed and sonic noise is reduced. A control circuit controls a selector to apply control to output a full-drive waveform at startup and then output a PWM modulation waveform. The full-drive waveform which is an alternating waveform in which positive and negative are inverted at 180° is output. Then, the PWM drive waveform is selected.

20 Claims, 9 Drawing Sheets

US 8,890,447 B2

STARTUP CONTROL CIRCUIT OF DRIVE CIRCUIT

CROSS-REFERENCE TO RELATED APPLICATIONS

The entire disclosure of Japanese Patent Application No. 2010-215908 filed on Sep. 27, 2010, including specification, claims, drawings, and abstract, is incorporated herein by reference in its entirety.

BACKGROUND

1. Technical Field

The present invention relates to a startup control circuit of a drive circuit which controls driving of a motor at startup.

2. Background Art

Recently, for a vibration function equipped in portable phones or game machines, a position detecting circuit which uses a Hall element is used for detecting a position of a vibration element.

When a magnet is employed as a rotor and a coil is employed as a stator, the Hall element detects a position of the rotor, and a drive circuit supplies a current to the coil based on a detection result of the Hall element.

There exists a demand for minimizing power consumption in an electronic device, and there also is a demand for minimizing sonic noise generated from the device.

In a vibration motor which has the vibration element in the related art, of the currents supplied to two coils, currents around 0° and 180° do not significantly contribute to the driving of the motor. In consideration of this, an electricity application method which cuts the currents around 0° and 180° of the motor drive current has been proposed. For example, an electricity application method which cuts electricity application for 30° around 0° and 180° is known as 150°-electricity application.

The 150°-electricity application does not have sufficient power, and when the device is to be driven based on the rotational state signal, there has been a problem in that the rotation is not started if the start of the drive coincides with the period where the electricity is not applied.

SUMMARY

According to one aspect of the present invention, there is provided a startup control circuit of a drive circuit which controls driving of a motor at startup, the startup control circuit comprising a full-drive waveform output circuit which outputs a full-drive waveform which is an alternating waveform in which positive and negative are inverted at 180°, a PWM circuit which obtains a PWM drive waveform by applying pulse-width modulation to the full-drive waveform, a selector which selects one of the full-drive waveform and the PWM drive waveform, and a control circuit which controls the selector to apply control to output the full-drive waveform at startup and then output the PWM drive waveform.

According to various aspects of the present invention, a reliable startup can be realized, and at the same time a suitable rotational speed can be reached in a short time, which allows for further reduction of the sonic noise and further reduction of power consumption.

BRIEF DESCRIPTION OF THE DRAWINGS

A preferred embodiment of the present invention will be described in further detail based on the following drawings, wherein.

DESCRIPTION OF EMBODIMENT

A preferred embodiment of the present invention will now be described with reference to the drawings.

Figure 1:
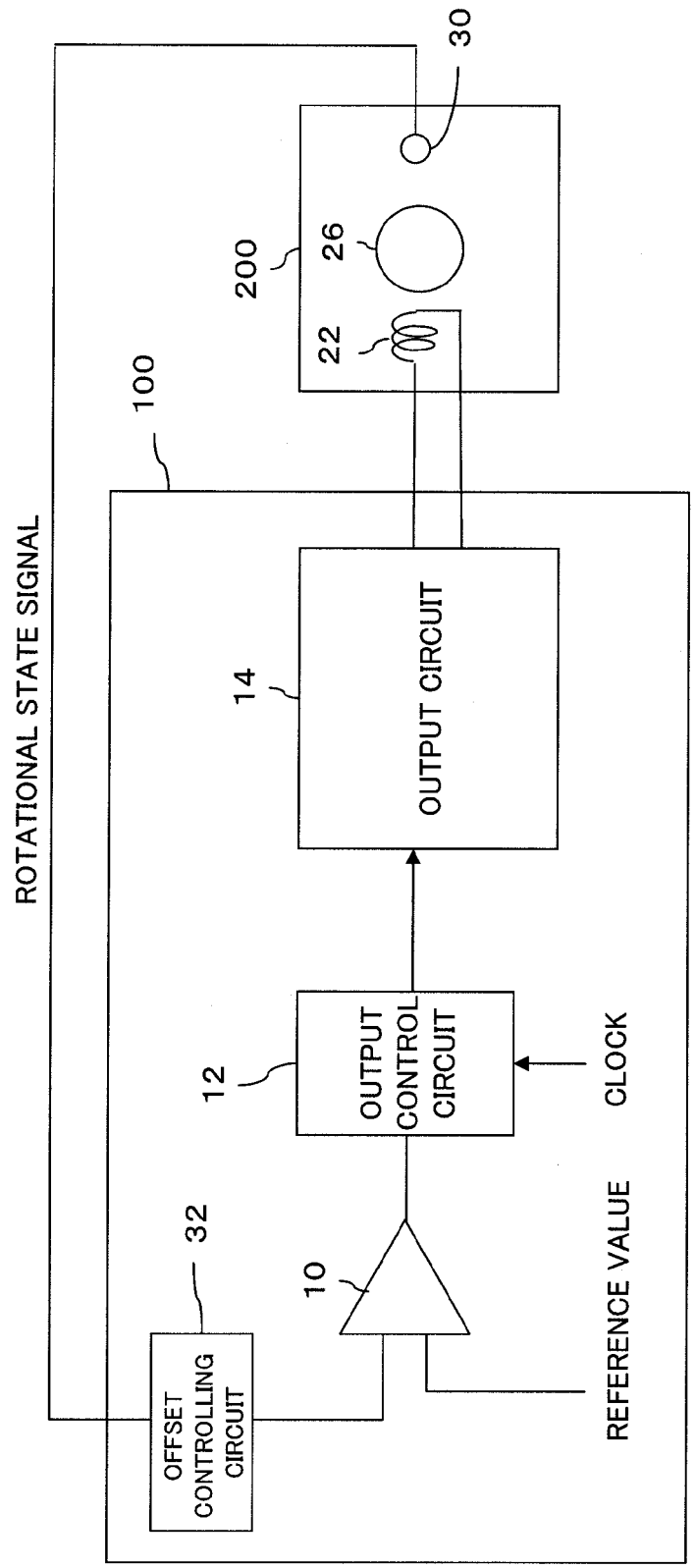
FIG. 1 is a block diagram showing an overall structure.

A preferred embodiment of the present invention will now be described with reference to the drawings. FIG. 1 is a diagram showing an overall structure. A system comprises a driver 100 and a motor 200. An input signal is input to the driver 100, and the driver 100 supplies a drive current corresponding to the input signal to the motor 200. In this manner, rotation of the motor 200 is controlled according to the input signal.

The driver 100 comprises a comparator 10, and a rotational state signal corresponding to a rotor position from a Hall element 30 provided on the motor 200 is supplied through an offset controlling circuit 32 to one terminal of the comparator 10. More specifically, the offset controlling circuit 32 adds a predetermined offset value to the rotational state signal, and an added signal which is alternately shifted in the up-and-down direction is obtained. The added signal is supplied to the one terminal of the comparator 10. A reference value voltage is supplied to the other terminal of the comparator 10, and the comparator 10 detects that the added signal has reached the reference value.

An output of the comparator 10 is supplied to an output control circuit 12. The output control circuit 12 determines a drive waveform (phase) of a predetermined frequency according to the output signal of the comparator 10, and the drive control signals (OUT1, OUT2) are controlled to be PWM-driven, so that the amplitude of the drive current is determined. The generated drive control signal is supplied to an output circuit 14.

The output circuit 14 comprises a plurality of transistors, controls a current from the power supply by switching of the transistors to generate a motor drive current, and supplies the motor drive current to the motor 200.

Figure 2:
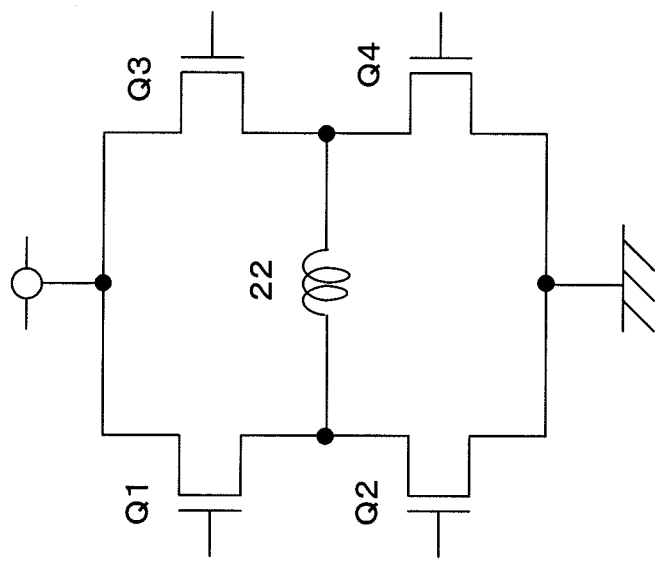
FIG. 2 is a diagram showing an example configuration of an output circuit.

FIG. 2 shows a structure of a part of the output circuit 14 and one coil 22 of the motor 200. As shown in FIG. 2, an arm comprising a series connection of two transistors Q1 and Q2 and an arm comprising a series connection of two transistors Q3 and Q4 are provided between the power supply and the ground, and a coil 22 is connected between an intermediate point of the transistors Q1 and Q2 and an intermediate point of the transistors Q3 and Q4. By switching the transistors Q1 and Q4 ON and the transistors Q2 and Q3 OFF, a current of one direction is supplied to the coil 22, and, by switching the transistors Q1 and Q4 OFF and the transistors Q2 and Q3 ON, a current of an opposite direction is supplied to the coil 22. The coil 22 is driven in this manner.

The motor 200 comprises the coil 22 and a rotor 26. In addition, a permanent magnet is provided on the rotor 26, and, for example, an N pole and an S pole are placed on opposed positions (positions different from each other by 180°). A stable position is determined according to a magnetic field from the coil 22.

Therefore, by supplying an alternating current, it is possible to move the rotor 26 by the phase of the current and rotate the rotor 26. In addition, by stopping the change of the phase of the current at the time of a certain phase of current, it is possible to stop the rotor at a position corresponding to the current phase at that point in time. In this manner, the rotation of the motor 200 is controlled.

The Hall element 30 is provided on the motor 200, and the rotational state signal is generated according to the magnetic field from the permanent magnet of the rotor 26. When there are one N pole and one S pole as described above, a sine wave having a period of one rotation of the rotor 26 is obtained as the rotational state signal.

The rotational state signal from the Hall element 30 is supplied to the offset controlling circuit 32. The offset controlling circuit 32 shifts the rotational state signal by a predetermined amount of offset, and sets an interval between two reference cross points (in the example configuration, zero-cross points) to, for example, 150°.

Figure 3:
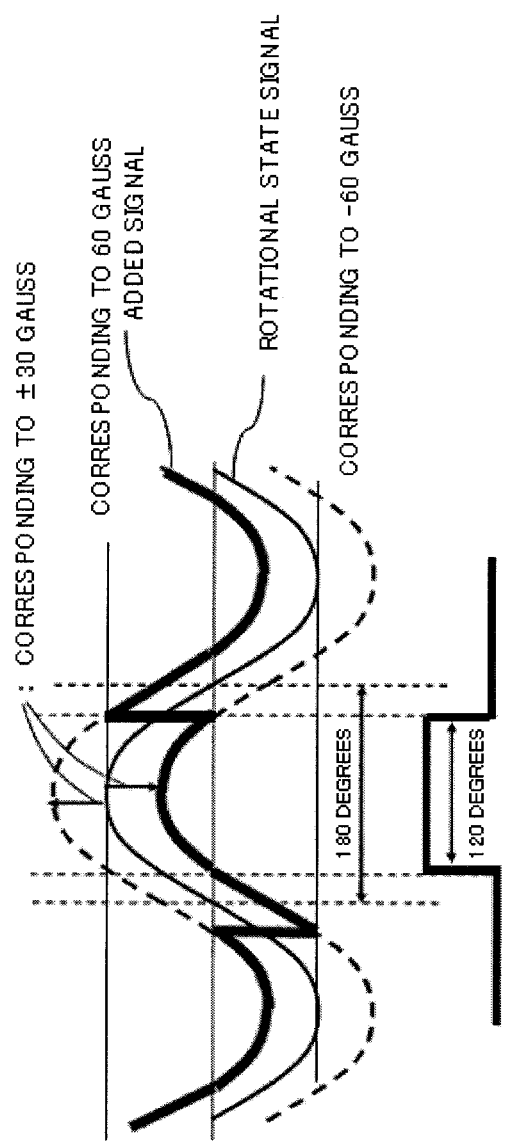
FIG. 3 is a diagram showing an example of an added signal.

FIG. 3 shows an example configuration in which the interval between zero-cross points is changed from 180° to 120°. The rotational state signal is a sine wave of a voltage which corresponds to 0 Gauss at 0°, to +60 Gauss at 90°, to 0 Gauss at 180°, and to −60 Gauss at 270°. Therefore, by setting the rotational state signal closer to zero by a voltage corresponding to 30 Gauss, it is possible to set the interval between two zero-cross points to 120°. Thus, when the added signal to which an amount corresponding to +30 Gauss is added on the negative (−) side (signal in which the rotational state signal is set closer to zero by an amount corresponding to 30 Gauss) reaches zero for the first time (phase of −30° of the rotational state signal), an addition of −30 Gauss (subtraction of 30 Gauss) is employed in place of +30 Gauss. In this manner, the added signal is shifted in the negative (−) direction by an amount corresponding to 60 Gauss. In the case of this example configuration, because the addition of an amount corresponding to −60 Gauss corresponds to a shift corresponding to 60°, the added signal reaches the zero from the negative (−) side for a second time at the phase of the rotational state signal of +30°. In the case of the zero for the second time, the added signal transitions to the positive (+) side with the addition of −30 Gauss unchanged. Then, at the reaching of the zero from the positive (+) side for the first time, the addition is switched to +30 Gauss. In this manner, the amount of offset is switched from +30 Gauss to −30 Gauss at the phase of the rotational state signal of 330°) (−30°, the amount of offset is switched from −30 Gauss to +30 Gauss at the phase of 150°, and these operations are repeated so that a signal of a period of 120° between the zero of the added signal for the second time to the zero for a next time is obtained. In FIG. 3, an example configuration where the interval between the zero-cross points is set to 120° is shown, but by adjusting the amount of offset to be added (in this case, to an amount corresponding to ±15 Gauss), a signal having a period of 150° or the like can be obtained.

Alternatively, a configuration may be employed in which a voltage having the same potential as a common voltage of the Hall element 30 is supplied as the reference to the other terminal of the comparator 10. With such a configuration, the reference values used in the Hall element 30 and the comparator 10 become equal to each other, and the electricity application period to the coil 22 can be set more accurately.

Figure 4:
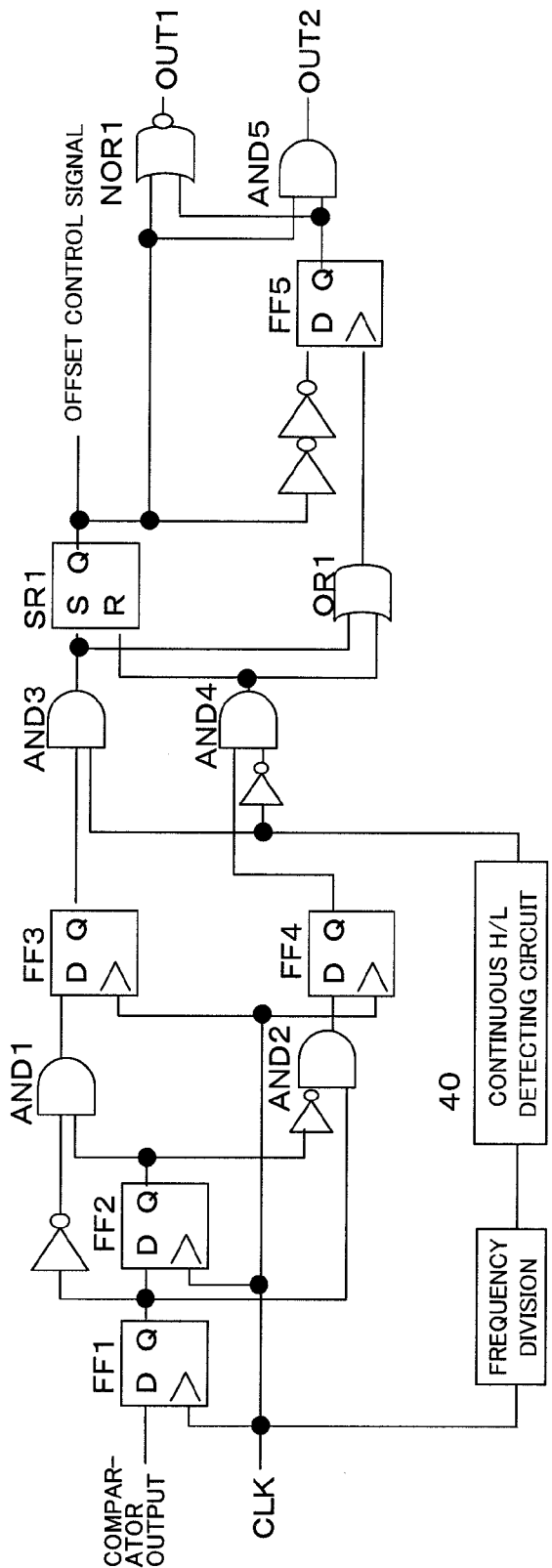
FIG. 4 is a diagram showing an example configuration of an output control circuit.
Figure 5:
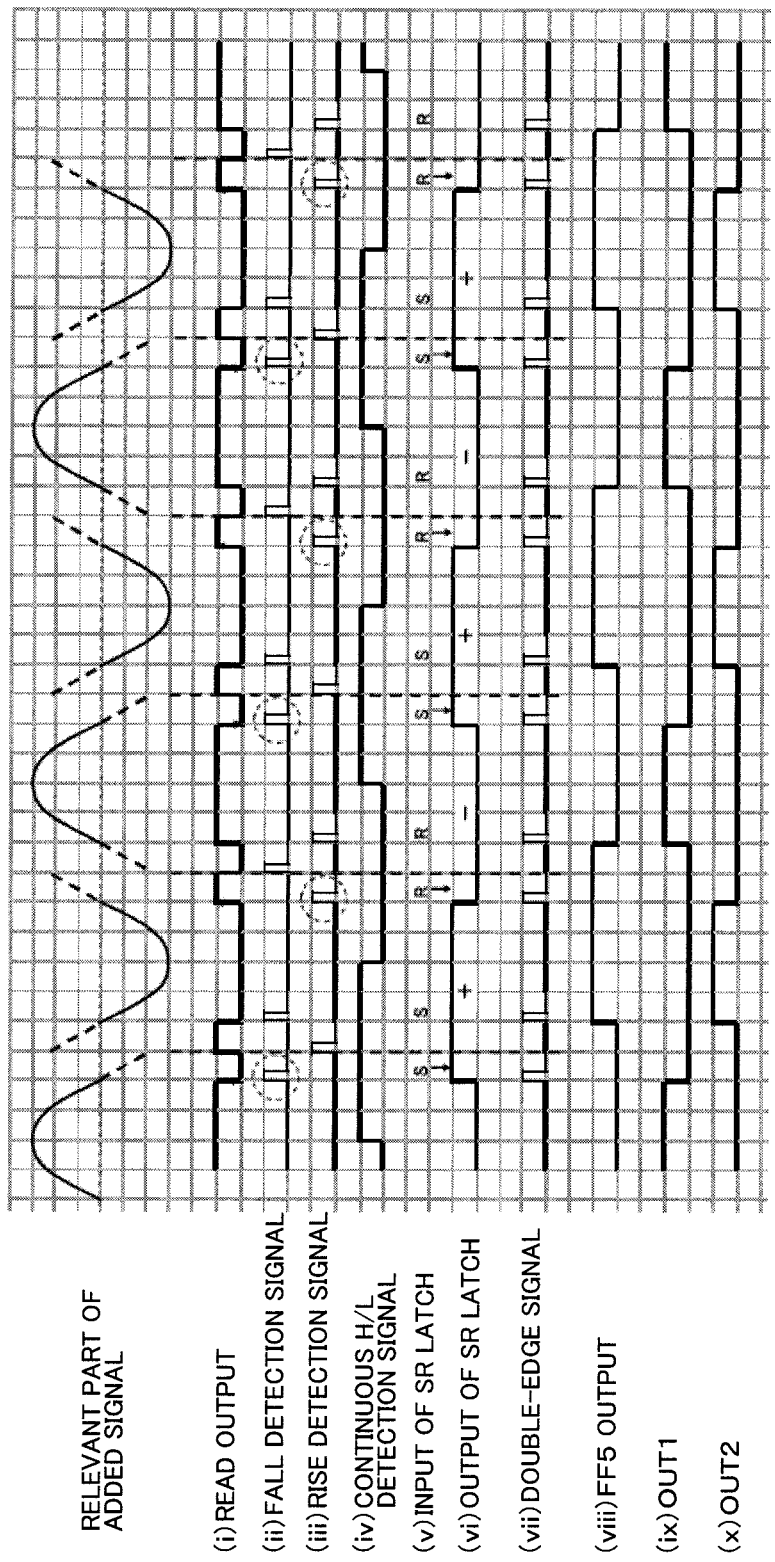
FIG. 5 is a diagram showing a signal waveform of each section of the output control circuit.

FIG. 4 shows an example configuration of the output control circuit 12, which is a structure for applying 150°-electricity application (150°-electricity application generating circuit 50), and FIG. 5 shows a signal waveform of each section. An output of the comparator (comparator raw output) detects a zero-cross point of a signal obtained by sequentially shifting the rotational state signal in a manner described above. The example configuration shows an example of 120°-electricity application, similar to FIG. 3. The read output when the comparator raw output is read by a flip-flop is L level for the rotational state signal of 0° to 30°, H level for the rotational state signal of 30° to 150°, L level for the rotational state signal of 150° to 180°, H level for the rotational state signal of 180° to 210°, L level for the rotational state signal of 210° to 330°, and H level for the rotational state signal of 330° to 360° (FIG. 5(*i*)).

The comparator raw output is supplied to a D input terminal of a flip-flop FF1. A predetermined clock CLK is supplied to a clock input terminal of the flip-flop FF1, and the flip-flop FF1 sequentially holds the output of the comparator 10. Because the clock CLK has a high frequency compared to the change of the output of the comparator 10, the flip-flop FF1 reads the output of the comparator 10 without any further processing and with a delay of a predetermined period.

The output of the flip-flop FF1 is supplied to a D input terminal of a flip-flop FF2, and the clock CLK is supplied to a clock input terminal of the flip-flop FF2. Therefore, the output of the flip-flop FF2 is a signal which is delayed by one period of the clock CLK compared to the output of the flip-flop FF1. The output of the flip-flop FF1 is inverted and input to an AND gate AND1, and the output of the flip-flop FF2 is input to the AND gate AND1 without being inverted. Therefore, the output of the AND gate AND1 is a signal which rises for one period of the clock CLK when the output of the comparator 10 falls.

More specifically, as shown by a fall detection signal of FIG. 5 (ii), a signal which rises for one period of the clock CLK at the fall of the read output is obtained at the output of the AND gate AND1.

In addition, the output of the flip-flop FF1 and an inverted output of the flip-flop FF2 are input to an AND gate AND2. Therefore, as shown by a rise detection signal of FIG. 5 (iii), a signal which rises for one period of the clock CLK at the rise of the read output is obtained at an output of the AND gate AND2.

In FIG. 5, the fall detection signal (ii) and the rise detection signal (iii) are shown as pulses shorter than the clock CLK. This is because a signal having a higher frequency than the clock CLK is used as the clock for fall and rise detection and one clock is set as the detection pulse, but the overall operation is no different.

After a predetermined frequency division is applied to the clock CLK, the clock CLK is input to a continuous H/L detecting unit 40. The continuous H/L detecting unit 40 is set to the H level, for example, when the H level in the read output is continued for a period of 60° and to the L level when the L level in the read output is continued for a period of 60°. Therefore, in the example configuration, the output of the continuous H/L detecting unit 40 is at the H level for a period of the rotational state signal of 90° to 270° and at the L level for the remaining half period (FIG. 5(*iv*)).

The output of the AND gate AND1 is supplied to a D input terminal of a flip-flop FF3, and the output of the AND gate AND2 is supplied to a D input terminal of a flip-flop FF4. The clock CLK is supplied to clock input terminals of the flip-flops FF3 and FF4. Therefore, the outputs of the AND gates AND1 and AND2 are read to the flip-flops FF3 and FF4. The outputs of the flip-flops FF3 and FF4 are input to AND gates AND3 and AND4, respectively. The continuous H/L detection signal is input to the other input terminal of the AND gate AND3, and an inverted signal of the continuous H/L detection signal is input to the other input terminal of the AND gate AND4. Therefore, in the output of the AND gate AND3, a pulse corresponding to the rotational state signal of 0° in the fall detection signal is removed, and only pulses of 150° and 210° remain. Similarly, in the output of the AND gate AND4, a pulse corresponding to the rotational state signal of 180° in the rise detection signal is removed, and only pulses of 30° and 330° remain.

The output of the AND gate AND3 is supplied to a set input terminal of an SR latch circuit SR1, and the output of the AND gate AND4 is supplied to a reset input terminal of the SR latch circuit SR1 (FIG. 5(v)). Therefore, as shown in FIG. 5(vi), an offset control signal which becomes the H level at the rotational state signal of 330° and which becomes the L level at the rotational state signal of 150° is obtained at an output of the SR latch SR1. The output of the SR latch SR1 is supplied to the offset controlling circuit 32, and is used for switching control to add a predetermined offset value (corresponding to 30 Gauss) to the rotational state signal when the output is at the H level and to subtract a predetermined offset value (corresponding to 30 Gauss) from the rotational state signal when the output is at the L level.

The outputs of the AND gates AND3 and AND4 are input to an OR gate OR1. A double-edge signal having four pulses at 330°, 30°, 150°, and 210° is obtained at an output of the OR gate OR1 (FIG. 5(vii)). The offset control signal is delayed by a predetermined amount, and then supplied to a D input terminal of a flip-flop FF5. The double-edge signal from the OR gate OR1 is supplied to a clock input terminal of the flip-flop FF5, and a signal which becomes the H level at the rotational state signal of 30° and which becomes the L level at the rotational state signal of 210° is obtained at an output of the flip-flop FF5 (FIG. 5 (viii)).

The output of the flip-flop FF5 is input to a NOR gate NOR1 and an AND gate AND5, and the output of the SR latch SR1 is supplied to the other input terminals of the NOR gate NOR1 and the AND gate AND5. Thus, a drive control signal OUT1 which becomes the H level only for a period from 30° to 150° is obtained at an output of the NOR gate NOR1 (FIG. 5(ix)), and a drive control signal OUT2 which becomes the H level only for a period from 210° to 330° is obtained at an output of the AND gate AND5 (FIG. 5(x)).

The drive control signals OUT1 and OUT2 are supplied to the output circuit 14 to control the switching ON/OFF of the transistors Q1 and Q4 and the transistors Q3 and Q2 shown in FIG. 2, so that the drive current control of the coil 22 as described above is executed.

In FIG. 1, because the Hall element 30 is placed at a position opposing the coil 22, a rotational state signal which is synchronized with the coil 22 is obtained, but the position of placement of the Hall element 30 is not necessarily limited. In addition, as described above, the amount of offset to be added to or subtracted from the rotational state signal can be adjusted, to easily realize 150°-electricity application or the like.

The 150°-electricity application has a lower power for rotating the rotor compared to the 180°-electricity application. In addition, when the start of the electricity application coincides with the electricity stopping period, the rotation of the rotor does not start, and the rotational state signal cannot be obtained. Thus, some measures must be taken for startup.

Figure 6:
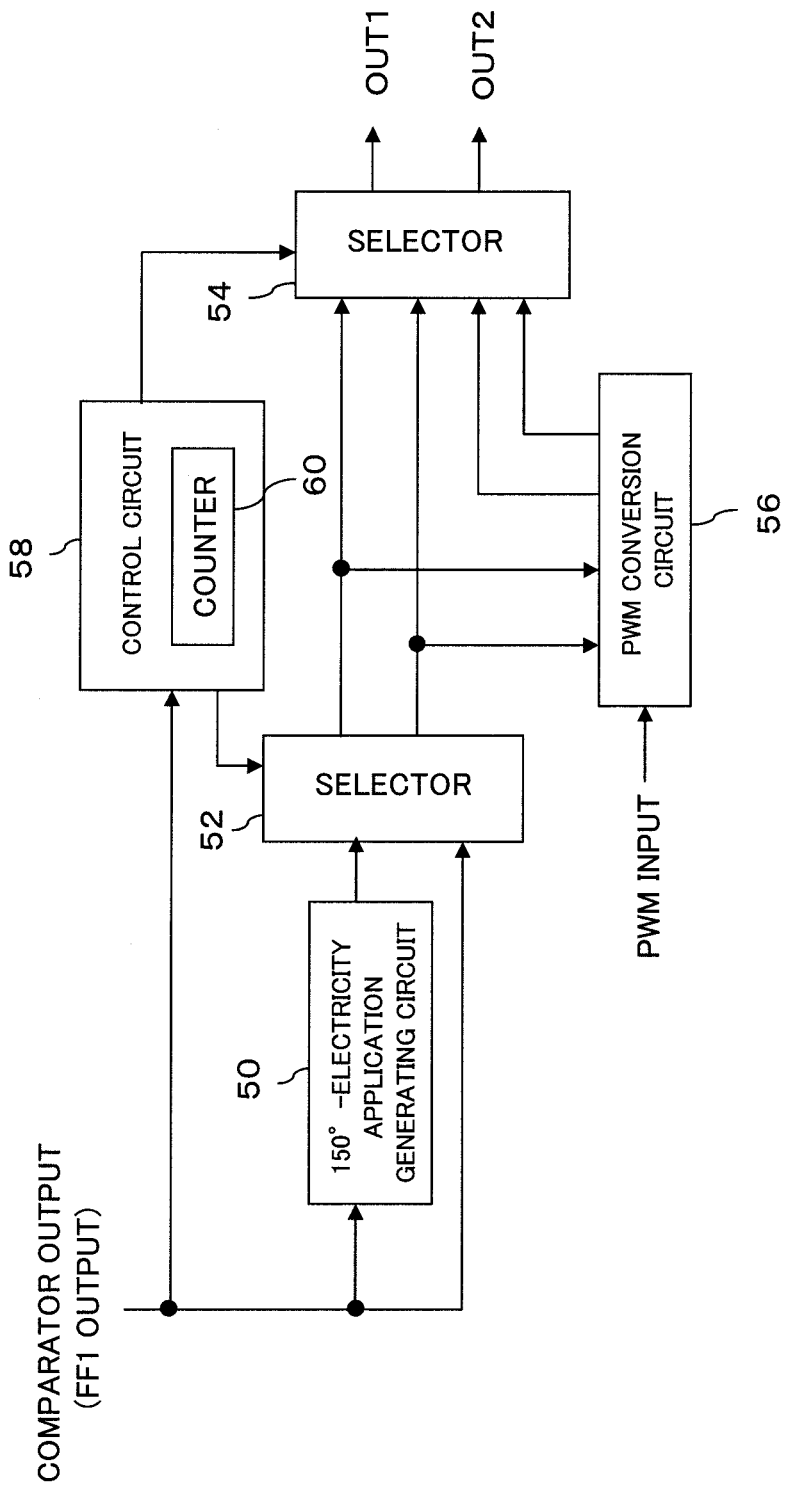
FIG. 6 is a diagram showing a structure of a startup control circuit.

In the present embodiment, the electricity application method is switched at startup. FIG. 6 shows a structure of a startup control circuit for switching the electricity application method.

The comparator output from the comparator 10 is input to a 150°-electricity application generating circuit 50. The 150°-electricity application generating circuit 50 has a structure of the output control circuit 12 shown in FIG. 4. An output of the 150°-electricity application generating circuit 50 is supplied to a selector 52 as a 150°-electricity application drive signal. The comparator output is also supplied to the selector 52 as a 180°-electricity application drive signal. In reality, an output of the flip-flop FF1 of FIG. 4 reading the comparator output with the clock CLK is supplied to the selector 52 as the 180°-electricity application drive signal.

An output of the selector 52 is supplied to a selector 54 and also to a PWM conversion circuit 56. The PWM conversion circuit 56 applies PWM modulation to a drive control signal supplied from the selector 52 (OUT1 and OUT2 in FIG. 4). Specifically, power required for the current motor drive state is determined by an external microcomputer or the like, a duty ratio corresponding to the power required at that point of time is determined according to the determined power, and PWM conversion is applied to the drive control signal of a rectangular wave from the selector. In this example configuration, a PWM input of a predetermined duty ratio is supplied, and the signal is converted into a PWM signal by applying an AND operation between the signal and the output of the selector.

The comparator output (output of the flip-flop FF1) is also input to a control circuit 58. The control circuit 58 has a counter 60, and counts a number of alternations of the comparator output which is input. Based on a result of the counting, the control circuit 58 controls the selectors 52 and 54 and selects a drive control signal to be output.

For example, the control circuit 58 selects the 180°-electricity application drive signal at the start up, selects the 150°-electricity application drive signal when the count value reaches a first set value, and selects a PWM-converted drive signal when the count value reaches a second set value.

The output from the selector 54 is applied to gates of the transistors Q1~Q4 in FIG. 2, and the supply of current to the coil 22 is controlled.

Figure 7:
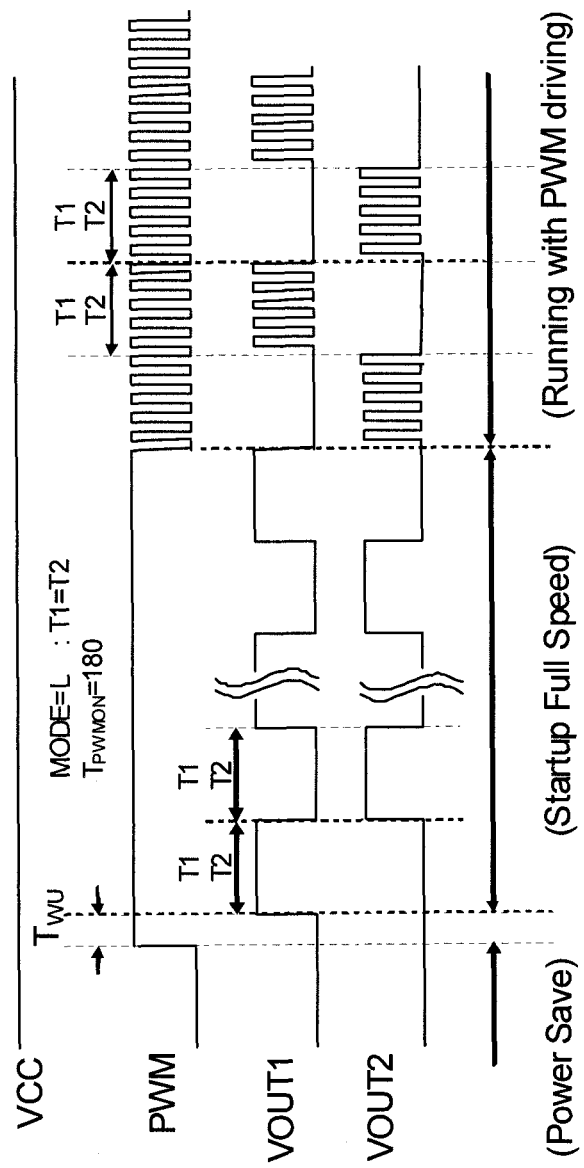
FIG. 7 is a diagram showing an example of a drive waveform at startup.

FIG. 7 shows an example waveform of the drive control signal. When the motor is stopped, the device is set in a power save mode, and there is no output signal. When a drive instruction is received, first, the PWM signal is started with a duty ratio of 100%. After a preparation period $T_{WU}$ has elapsed, the circuit of FIG. 4 is started, and the 180°-electricity application drive control signal is obtained at OUT1 and OUT2. After the second set period has elapsed, driving is started based on a 180°-electricity application PWM signal obtained by multiplying the 180°-electricity application drive control signal by a predetermined PWM signal.

As described, in this example configuration, the driving at startup is executed in the order of 180°-electricity application and then 180°-electricity application PWM driving.

Figure 8:
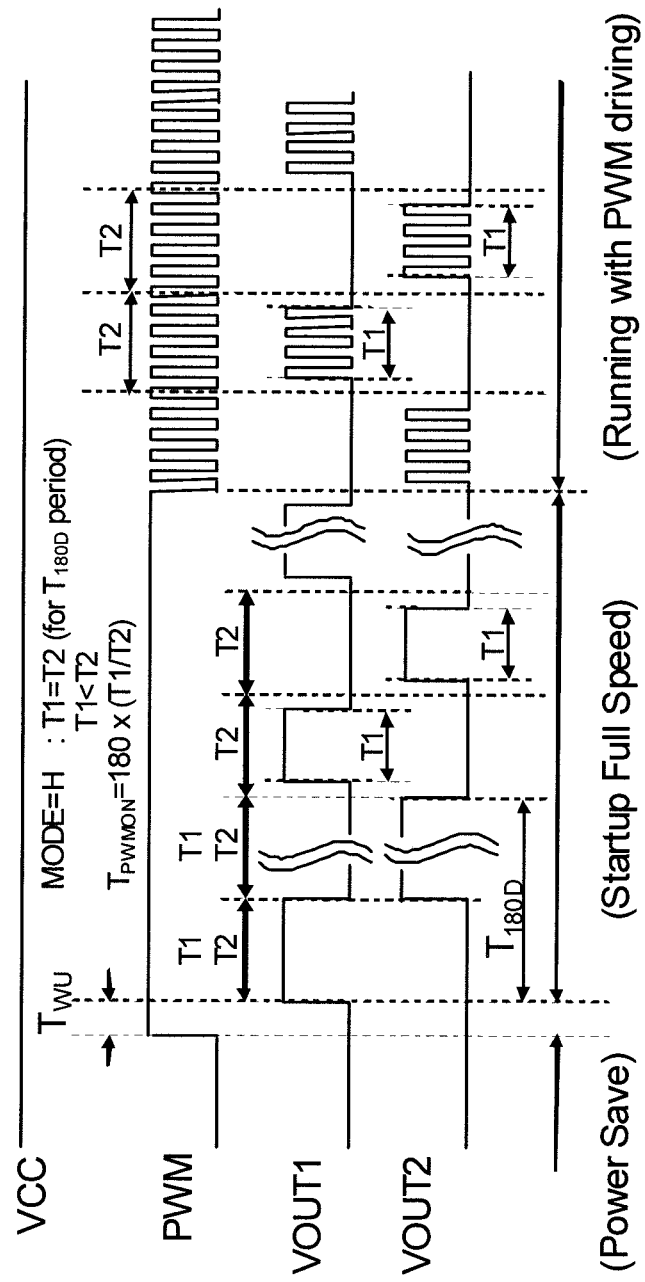
FIG. 8 is a diagram showing another example drive waveform at startup.

FIG. 8 shows another example waveform of the drive control signal. Similar to the case of FIG. 7, when a drive instruction is received, the PWM signal is first started with a duty ratio 100%, and then the 180°-electricity application drive control signal is obtained at OUT1 and OUT2. When the counter 60 reaches the first set value and the 180°-electricity application period has elapsed, the period enters the 150°-electricity application period. When the counter 60 reaches the second set value and the 150°-electricity application period has elapsed, a PWM-converted drive signal in the 150°-electricity application is output.

As described, in the example configuration, the driving at startup is realized in the order of 180°-electricity application, then 150°-electricity application, and then 150°-electricity application PWM driving.

In this manner, in the present embodiment, at startup, first the 180°-electricity application of a rectangular wave is executed. Therefore, the motor can be started in a short period and reliably at full power. The 180°-electricity application period is set to a period until the motor reaches the normal rotational speed. Then, the power consumption is reduced by PWM drive. In this case, by providing the 150°-electricity application period and transitioning to the PWM drive after the motor is controlled to an optimum rotational speed, it is possible to improve the time until the optimum rotational speed is reached, and to suitably reduce the power consumption afterwards. The 150°-electricity application period is preferably set to a period required for controlling the rotational speed to the optimum rotational speed. In addition, in the PWM drive, the sonic noise is also reduced compared to the 180°-rectangular wave electricity application. Moreover, with the 150°-electricity application, the sound noise can be significantly improved. Furthermore, with the 150°-electricity application, generation of a reverse torque can be inhibited, and the power consumption can be further reduced.

Figure 9:
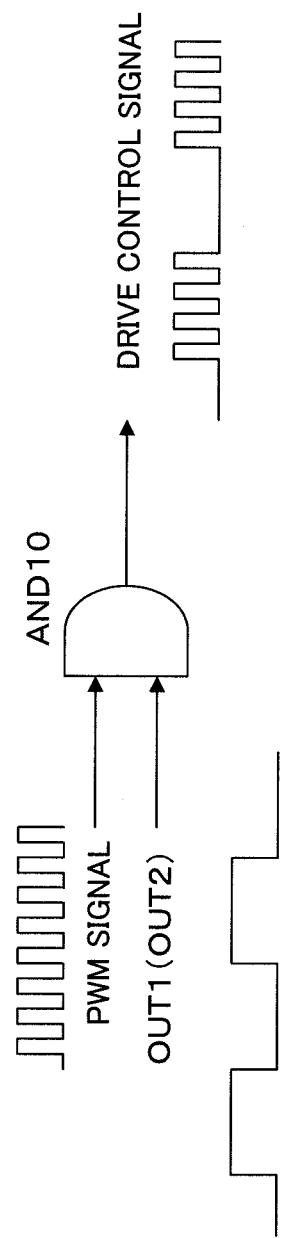
FIG. 9 is a diagram showing a structure for generating a drive control signal based on a PWM signal.

FIG. 9 shows an example structure of PWM conversion of the drive control signal. As shown, by obtaining a logical multiple of the signals with an AND gate AND10, it is possible to obtain a PWM-converted drive control signal.

What is claimed is:

1. A startup control circuit of a drive circuit which controls driving of a motor at startup, the startup control circuit comprising:
a full-drive waveform outputting circuit which outputs a full-drive waveform which is an alternating waveform in which positive and negative are inverted at 180°;
a limited drive waveform outputting circuit which outputs a limited drive waveform in which a predetermined drive stop period is provided at a time when the positive and the negative are inverted;
a PWM circuit which obtains a PWM drive waveform by applying pulse-width modulation to the limited drive waveform;
a selector which selects one of the full-drive waveform and the PWM drive waveform; and
a control circuit which controls the selector to apply control to output the full-drive waveform at startup and then output the PWM drive waveform.

2. The startup control circuit of the drive circuit according to claim 1, wherein
switching of the drive waveform in the control circuit is executed according to a count value of a number of alternations in a rotational state signal detecting rotation of the motor.

3. The startup control circuit of claim 1, further comprising a 150°-electricity application generating circuit which modifies the PWM drive waveform after an initial period of time.

4. The startup circuit of claim 1, wherein the control circuit applies control to output the full-drive waveform at startup, then output the PWM drive waveform, and then output the limited drive wave to which the pulse-width modulation is applied.

5. The startup circuit of claim 1, further comprising a comparator circuit that provides an output signal to the full-drive waveform outputting circuit and the limited drive waveform outputting circuit, wherein the output of the comparator is produced by comparing the output of an offset controlling circuit with a reference voltage, wherein the offset controlling circuit receives an output from a Hall device that senses a rotational position of the motor and wherein the offset controlling circuit adds an offset to the output of the Hall device.

6. The startup control circuit of claim 5, wherein switching of the drive waveform in the control circuit is executed according to a count value of a number of alternations in a rotational state signal detecting rotation of the motor.

7. The startup control circuit of claim 1, further comprising an output circuit that outputs the selected one of the full-drive waveform and the PWM drive waveform to an output circuit that alternates current direction through a coil in accordance with the selected waveform.

8. A startup control circuit of a drive circuit which controls driving of a motor at startup, the startup control circuit comprising:
a full-drive waveform outputting circuit which outputs a full-drive waveform which is an alternating waveform in which positive and negative are inverted at 180°;
a limited drive waveform outputting circuit which outputs a limited drive waveform in which a predetermined drive stop period is provided at a time when the positive and the negative are inverted;
a selector which receives the full-drive waveform and the limited drive waveform and which selects and outputs one of the full-drive waveform and the limited drive waveform;
a PWM circuit which applies pulse-width modulation to the limited drive waveform; and
a control circuit which controls the selector and the PWM circuit to apply a control to output the full-drive waveform at startup and then output a limited drive wave obtained by applying the pulse-width modulation to the limited drive waveform.

9. The startup control circuit of the drive circuit according to claim 8, wherein
the control circuit applies control to output the full-drive waveform at startup, then output the limited drive waveform, and then output the limited drive wave to which the pulse-width modulation is applied.

10. The startup control circuit of the drive circuit according to claim 9, wherein
switching of the drive waveform in the control circuit is executed according to a count value of a number of alternations in a rotational state signal detecting rotation of the motor.

11. The startup control circuit of the drive circuit according to claim 8, wherein
switching of the drive waveform in the control circuit is executed according to a count value of a number of alternations in a rotational state signal detecting rotation of the motor.

12. The startup control circuit of claim 8, further comprising a 150°-electricity application generating circuit which modifies the limited drive waveform after an initial period of time.

13. The startup control circuit of claim 12, further comprising an output circuit that outputs the selected one of the full-drive waveform and the PWM drive waveform to an output circuit that alternates current direction through a coil in accordance with the selected waveform.

14. A motor control circuit, comprising:
a full-drive waveform outputting circuit which outputs a full-drive waveform which is an alternating waveform in which positive and negative are inverted at 180°;

a limited drive waveform outputting circuit which outputs a limited drive waveform in which a predetermined drive stop period is provided at a time when the positive and the negative are inverted;

a selector which receives the full-drive waveform and the limited drive waveform and which selects and outputs one of the full-drive waveform and the limited drive waveform;

a PWM circuit which applies pulse-width modulation to the limited drive waveform; and a control circuit which controls the selector and the PWM circuit to apply a control to output the full-drive waveform at startup and then output a limited drive wave obtained by applying the pulse-width modulation to the limited drive waveform, wherein switching of the drive waveform in the control circuit is executed according to a count value of a number of alternations in a rotational state signal detecting rotation of the motor.

15. The motor control circuit of claim 14, wherein the control circuit applies control to output the full-drive waveform at startup, then output the limited drive waveform, and then output the limited drive wave to which the pulse-width modulation is applied.

16. The motor control circuit of claim 14, wherein switching of the drive waveform in the control circuit is executed according to a count value of a number of alternations in a rotational state signal detecting rotation of the motor.

17. The motor control circuit of claim 14, further comprising an output circuit that outputs the selected one of the full-drive waveform and the PWM drive waveform to an output circuit that alternates current direction through a coil in accordance with the selected waveform.

18. The motor control circuit of claim 17, wherein the output circuit is a second selector.

19. The motor control circuit of claim 14, wherein the limited drive waveform inverts at 150°.

20. The motor control circuit of claim 14, further comprising a comparator circuit that provides an output signal to the full-drive waveform outputting circuit and the limited drive waveform outputting circuit, wherein the output of the comparator is produced by comparing the output of an offset controlling circuit with a reference voltage, wherein the offset controlling circuit receives an output from a Hall device that senses a rotational position of the motor and wherein the offset controlling circuit adds an offset to the output of the Hall device.

* * * * *